United States Patent [19]
Ferschl

[11] Patent Number: 5,146,241
[45] Date of Patent: Sep. 8, 1992

[54] AUTOMATIC CUT-OUT FOR AUTO-FOCUS DEVICE

[75] Inventor: Michael S. Ferschl, Rochester, N.Y.

[73] Assignee: Eastman Kodak Company, Rochester, N.Y.

[21] Appl. No.: 670,089

[22] Filed: Mar. 15, 1991

[51] Int. Cl.$^5$ .............................................. H04N 1/21
[52] U.S. Cl. .................................... 346/108; 358/474
[58] Field of Search .............. 346/108, 107 R, 76 L, 346/160; 358/474, 296; 355/200, 202

[56] References Cited

U.S. PATENT DOCUMENTS

| | | | |
|---|---|---|---|
| 3,623,790 | 11/1971 | Buckstad et al. | 350/46 |
| 4,268,165 | 5/1981 | Bradmon | 355/55 |
| 4,546,462 | 10/1985 | Koishi et al. | 369/53 |
| 4,748,610 | 5/1988 | Nakata et al. | 369/44 |
| 4,788,426 | 11/1988 | Kuehnle | 358/256 |
| 4,826,268 | 5/1989 | Kramer | 346/108 |
| 4,841,137 | 6/1989 | Mochizuki et al. | 346/108 |

*Primary Examiner*—Mark J. Reinhart
*Attorney, Agent, or Firm*—Robert L. Randall

[57] ABSTRACT

In an imaging apparatus utilizing a carriage member arranged to carry a writing element, the carriage member and the writing element each have at least one surface with at least one of the surfaces having a discontinuity therein. A light beam is movable with respect to the writing element and is projectable thereon to generate an image. A light beam focusing system is provided for focusing the light beam with respect to the writing element and includes an element for sensing at least one of the surfaces of the writing member and the carriage member to control the focusing means. A discontinuity indicator is provided to indicate when the discontinuity in the surface is proximate the surface sensor, and an inhibitor is responsive to the indicating means to inhibit the output of the surface sensor when the discontinuity is within its range to prevent the focusing system from focusing on the discontinuity.

13 Claims, 2 Drawing Sheets

AUTOMATIC CUT-OUT FOR AUTO-FOCUS DEVICE

BACKGROUND OF THE INVENTION

1. Field of the Invention

The present invention relates to a color proofing apparatus which utilizes an electronic signal input, and more particularly, to a method and apparatus for controlling the focusing of a writing beam in a thermal printer using lasers to prevent periodic focus excursions as a discontinuity in the media or the support is scanned past the focus detector.

2. Description of the Prior Art

Color-proofing is the procedure used by the printing industry for creating representative images that replicate the appearance of printed images without the cost and time required to actually set up a high-speed, high-volume printing press to print an example of the images intended. Ideally, these representative images, or proofs, are generated from the same color-separations used to produce the individual color printing plates used in printing presses so that variations in the resulting images can be minimized. Various color-proofing systems have been devised to create the proofs and have included the use of smaller, slower presses as well as means other than presses, such as photographic, electrophotographic, and non-photographic processes.

The proofs generated are judged for composition, screening, resolution, color, editing, and other visual content. The closer the proof replicates the final image produced on the printing press, as well as the consistency from image to image, from press to press, and from shop to shop, the better the acceptance of the proofing system by the printing industry. Other factors which influence the acceptability of proofing systems include speed, freedom from environmental problems, and cost of the system as well as the cost of the individual proofs. Further, since nearly all printing presses utilize the half-tone process for forming pictorial images, wherein the original image is screened, i.e. photographed through a screen to produce one or more single-color printing plates containing an image formed of a plurality of fine dots that simulate the varying density of the original image, proofing processes that employ the half-tone process to form an image are more acceptable to the printing industry than are continuous tone systems.

In recent years a variety of processes have been developed and implemented to electronically form, store, and manipulate images both for the actual printing as well as the proofing of images. While such electronic systems can handle and produce analog images, the most widely used systems employ digital processes because of the ease of manipulation of such digital images. In all of these electronic processes it is possible to display the resulting image on a CRT display, but it is still generally necessary to produce a "hard copy" (i.e. an image actually formed on a sheet of paper or other material) before that image can be assessed with confidence for approval of the final printing operation. Thus, all of these electronic systems require the use of some form of output device or printer which can produce a hard copy of the image for actual evaluation. It is to the field of proofing output devices that the present invention is directed.

While purely photographic processes can provide accurate reproductions of images, they do not always replicate the reproduction resulting from printing presses. Further, most photographic processes do not produce half-tone images that can be directly compared to the printed images they are supposed to replicate. Moreover, they are almost universally incapable of reproducing the images on the wide variety of paper or other material that can be run through a press. It is known that the appearance of the final printed image is affected by the characteristics of the paper or other material upon which it is printed; thus, the ability to form the proof image on the material actually to be used in the press can be a determining factor in the selection of the proofing system.

Other continuous tone proofing systems, such as thermal processes and ink-jet systems have been developed, but they have not been able to replicate the half-tone images so desired by the printing industry.

Electrophotographic proofing systems with half-tone capability have been introduced over the past few years which employ either wet or dry processes. The electrophotographic systems that use dry processes suffer from the lack of high resolution necessary for better quality proofing, particularly when the images are almost of continuous tone quality. This results from the fact that dry electrophotographic processes have not yet been developed which employ sufficiently small toner particle sizes that provide the requisite high image resolution. While wet electrophotographic processes have been developed that do employ toners with the requisite small particle size, these processes have other disadvantages such as the use of solvents that are environmentally undesirable.

In commonly assigned U.S. patent applications a thermal printer is disclosed which may be adapted for use as a direct digital color proofer with half-tone capabilities. This printer is arranged to form an image on a thermal print medium in which a donor element transfers a dye to a receiver element upon receipt of a sufficient amount of thermal energy. This printer includes a plurality of diode lasers which can be individually modulated to supply energy to selected areas of the medium in accordance with an information signal. The printer printhead includes one end of a fiber optic array having a plurality of optical fibers coupled to the diode lasers. The thermal print medium is supported on a rotatable drum, and the printhead with the fiber optic array is movable relative to the drum. The dye is transferred by sublimation to the receiver element as the radiation, transferred from the diode lasers to the donor element by the optical fibers, is converted to thermal energy in the donor element.

A direct digital color proofer utilizing a thermal printer such as that just described must be capable of consistently and accurately writing minipixels at a rate of 1800 dots per inch (dpi) and higher to generate half-tone proofs having a resolution of 150 lines per inch and above, as is necessary to adequately proof high quality graphic arts images such as those found in high quality magazines and advertisements. Moreover, it is necessary to hold each dot or minipixel to a density tolerance of better than 0.1 density unit from that prescribed in order to avoid visible differences between the original and the proof. This density control must be repeatable from image-to-image and from system-to-system. Moreover, this density control must also be maintained in each of the colors being employed in multiple passes through the proofer to generate a full color image.

Aspects of the apparatus which affect the density of the dots that make up the image include such things as variations and randomness of the intensity and frequency of the laser output, and variations in the output of the fiber optics which can vary from fiber to fiber and even within a single fiber as it is moved during the writing process. Variations in the finish of the drum surface as well as drum runout and drum bearing runout and variations in the parallelism of the translation of the printhead with respect to the axis of the drum will also affect the density of the image dots. The difference in the distance between the ends of individual fibers and the drum surface also affects image density because of the fact that the end of the fiber bundle is flat while the surface of the drum is curved. Temperature variations in the printhead due to the ambient temperature of the machine as well as the fact that the writing process itself heats the printhead also influence the image density.

Variations in the thermal print medium, or the writing element, such as variations in the thickness of the donor and receiver elements as well as the various layers that are a part thereof, can also affect the image density as it is being written.

Thus, it has been found necessary to continuously focus the writing beam as the image is being formed to assure that variations in the thickness of the donor and receiver elements, as well as other perturbations in the system, do not defocus the writing beam and adversely affect the image density or the sharpness of the image. Auto-focus systems have been developed utilizing the reflection of the writing beam, or of a separate focusing beam, from various surfaces of the writing element to focus the writing beam. Because of the nature of the writing beam, and the tolerances necessary to achieve the desired image quality, it has been found that the writing beam must be focused to within a few microns of a specific location in the writing element. Moreover, the limits of such focusing are further complicated by the fact that the lens used for such auto-focusing has a depth of field only in the order of microns.

In a commercial imaging apparatus the writing element is secured to a carriage, drum, or other support for the writing process. For ease of cutting and fitting the writing element to the drum, the writing element does not completely encompass the drum circumference, but leaves a portion of the drum uncovered between the leading and trailing ends of the writing element, which uncovered portion is perceived as a discontinuity by the auto-focus system. Ordinarily such a discontinuity would not create a problem since it lies outside the area in which the image is being formed. But where, as here, the focus of the writing beam is so critical and must be held to such close tolerances, and where the discontinuity is frequently scanned past the imaging beam, it has been found that the discontinuity can so adversely affect the auto-focus system that the focus cannot be immediately regained after the discontinuity has passed, so that the next portion of the image is out of focus for an indeterminate period of time. It is apparent that this is unacceptable, particularly when high quality proofing images are being formed.

Further, while a vacuum drum or platen provides a desirable means for mounting a writing element for this process, another means of initially securing the writing element to the support may be employed until the vacuum is applied. Such initial securing means may result in the formation of a discontinuity in the surface of the carriage or drum. Still further, in automated systems where both the donor element and the receiver element are automatically fed and secured to the support member, as well as released at the end of the writing process, may be advantageous to provide a "flat" in the drum surface to facilitate the automatic securing and releasing of the elements, which "flat" also forms a discontinuity.

Thus, it will be seen that a method and apparatus for preventing the auto-focus system from being confused by a discontinuity in the surface of the writing element or the support member is necessary to prevent the degradation of the image being written.

SUMMARY OF THE INVENTION

Accordingly, the present invention provides an imaging apparatus utilizing a carriage member arranged to carry a writing element. The carriage member and the writing element each have at least one surface and at least one of the surfaces has a discontinuity therein. Means is provided for generating a light beam movable with respect to the writing element and projectable thereon to generate an image. Means is provided for focusing the light beam with respect to the writing element including means for sensing at least one of the surfaces of the writing member and the carriage member to control the focusing means. Means is provided for indicating when the discontinuity in the surface is proximate the surface sensing means, and further means is responsive to the indicating means to inhibit the output of the sensing means when the discontinuity is within its range to prevent the focusing means from focusing on the discontinuity.

According to another embodiment of the present invention, in an imaging apparatus utilizing a receiver element upon which an image is written from a donor element by a light source, means is provided for mounting the donor and receiver elements in intimate superposed relationship on a rotatable drum member. Each of the receiver and donor elements and the drum member have at least one surface. The mounting means creates a discontinuity in the surface of the drum member. The light source is movable with respect to the drum member and is arranged to direct a beam of light to the donor element where it is at least partially absorbed to transfer an image to the receiver element. Means is provided for focusing the light source with respect to the donor element, including means for sensing at least one of the surfaces of the receiver and donor elements and the drum member to control the focusing means. The improvement comprises means for indicating when the discontinuity in the drum surface is proximate the surface sensing means including indicia means disposed on the end face of the drum member in a predetermined relationship with the discontinuity. Means is provided for reading the indicia means, which reading means is stationarily mounted adjacent the drum member relative to the indicia means so that the indicia is sensed by the reading means when the discontinuity is proximate the focusing means to generate a signal. Means responsive to the signal generated by said reading means is provided to inhibit the output of the sensing means when the discontinuity is within its range to prevent the focusing means from focusing on the discontinuity.

According to still another embodiment, in an imaging apparatus utilizing a receiver element upon which an image is written from a donor element by a light source, means is provided for mounting the donor and receiver elements in intimate superposed relationship on a rotatable drum member. Each of the receiver and donor elements and the drum member have at least one surface and a discontinuity is formed in at least one of the surfaces. The light source is movable with respect to the drum member and is arranged to direct a beam of light to the donor element where it is at least partially absorbed to transfer an image to the receiver element. Means is provided for focusing the light source with respect to the donor element and includes means for sensing at least one of the surfaces of the receiver and donor elements and the drum member to control the focusing means. The method of focusing comprising the steps of sensing at least one of the surfaces to control the focusing means, indicating when the discontinuity in the surface is proximate the surface sensing means by reading an indicia disposed on the end face of said drum member in a predetermined relationship with the discontinuity, generating a signal in response to the reading of the indicia, and inhibiting the output of the sensing means when the discontinuity is within its range to prevent the focusing means from focusing on the discontinuity.

Various means for practicing the invention and other features and advantages thereof will be apparent from the following detailed description of illustrative, preferred embodiments of the invention, reference being made to the accompanying drawings.

DESCRIPTION OF THE PREFERRED EMBODIMENT

Figure 1:
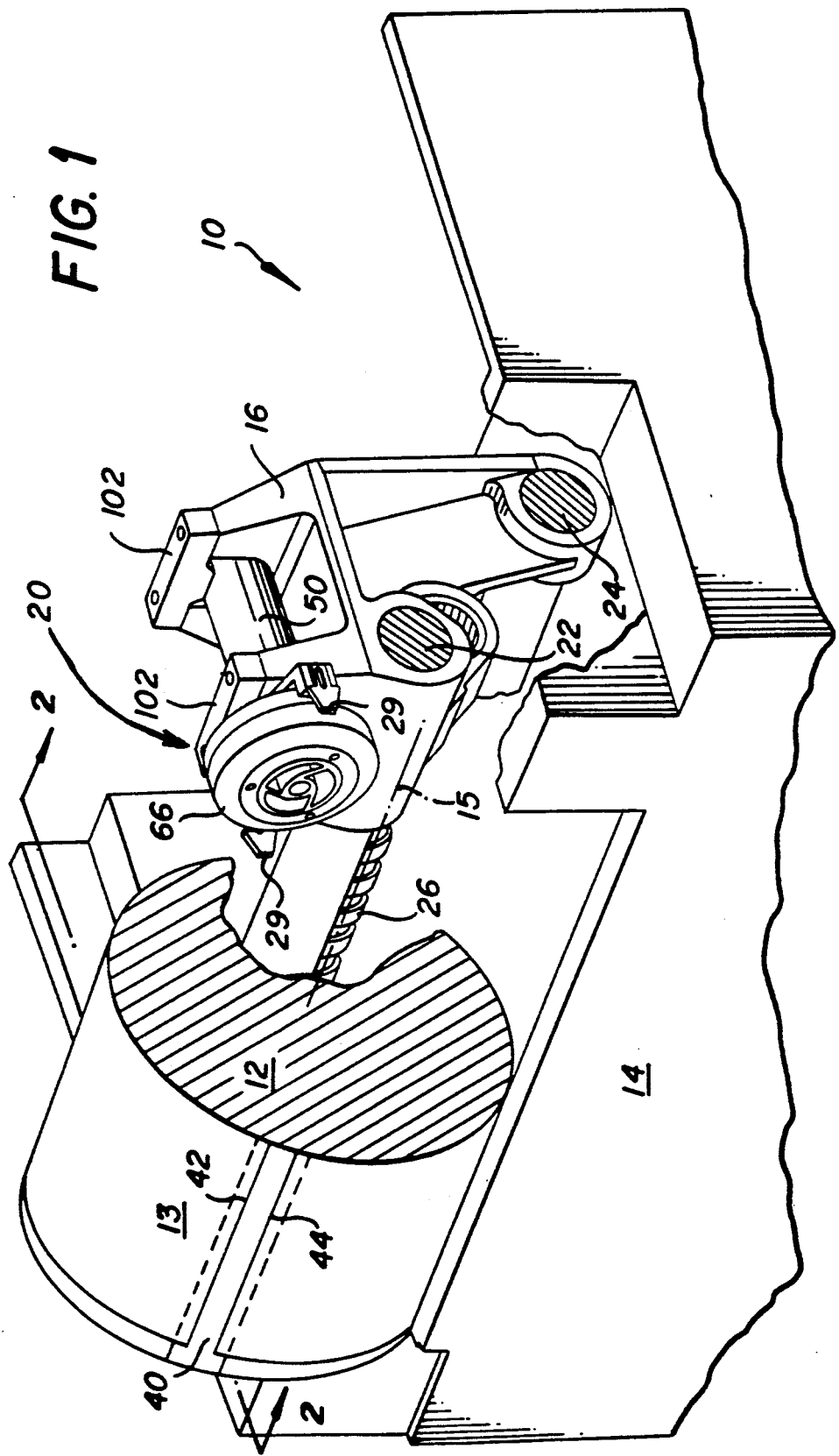
FIG. 1 is a perspective view of the imaging apparatus of the present invention, partially cut-away to reveal hidden portions thereof.

Referring now to FIG. 1, there is shown a thermal printer 10 comprising a drum member 12 mounted for rotation about an axis 15 in frame member 14. The drum member 12 is adapted to support a thermal print medium 13 of a type in which a dye is transferred by sublimation from a donor element to a receiver element as a result of heating the dye in the donor. The donor element and the receiver element are superposed in relatively intimate contact and are held onto the peripheral surface of the drum member by means such as by vacuum applied to the superposed elements from the drum interior. A thermal print medium for use with the printer 10 can be, for example, the medium disclosed in U.S. Pat. No. 4,772,582, which includes a donor sheet having a material which strongly absorbs at the wavelength of the exposing light source. When the donor element is irradiated, this absorbing material converts light energy to thermal energy and transfers the heat to the dye in the immediate vicinity, thereby heating the dye to its vaporization temperature for transfer to the receiver element. The absorbing material may be present in a layer beneath the dye, or it may be admixed with the dye and is strongly absorptive to light having wavelengths in the range of 800 nm–880 nm. An example of a preferred embodiment of a receiver element that can be used with the present invention is disclosed in a co-pending, commonly assigned U.S. patent application and entitled Intermediate Receiver Opaque Support. The receiver element disclosed therein incorporates a reflective layer which improves the efficiency of the dye transfer to the receiver element.

The light source is movable with respect to the drum member and is arranged to direct a beam of actinic light to the donor element. Preferably the light source comprises a plurality of laser diodes (not shown) which can be individually modulated by electronic signals which are representative of the shape and color of the original image, so that each dye (in a multi-color system utilizing a plurality of donor elements, each providing a single color, which are sequentially mated with the receiver element to generate a full color image) is heated to cause volatilization only in those areas in which its presence is required on the receiver to reconstruct the color of the original object. In the preferred embodiment, the laser diodes are mounted remotely from the drum member 12, on the stationary portion of the frame 14, and each direct the light produced thereby to the input end of a respective optical fiber which extends to and transfers the light to a movable writing head 20 adjacent the drum member. The laser diodes are selected to produce a first beam of light having wavelengths in the range of 800 nm–880 nm, and preferably, in the preferred embodiment, predominately at a wavelength of 830 nm.

The writing head 20 is moveably supported adjacent drum member 12 and is mounted on a moving translator member 16 which, in turn, is supported for slidable movement on bars 22 and 24. The bars 22 and 24 are sufficiently rigid that they do not sag between the mounting points at their ends and are arranged as exactly parallel with the axis of the drum member as possible. The translator member 16 is driven by means of a motor (not shown) which rotates a lead screw 26 parallel to bars 22 and 24 to move the writing head parallel with the axis of the drum member. The coupling (not shown) which connects the translator member to the lead screw is carefully chosen so that the only force imparted to the translator by the lead screw is parallel to the drum axis.

The writing head 20 is removably mounted on the translator member 16 so that it automatically adopts the preferred orientation with respect to the drum axis noted above. The writing head is selectively locatable with respect to the translator, and thus with respect to the drum surface and axis, with regard to its distance from the drum surface, and with respect to its angular position about its own axis. The end of the writing head 20 adjacent the drum member 12 is provided with a pair of photosensors 29 aimed at the surface of the drum member. The photosensors are disposed on diametrically opposite sides of the optical axis of the writing head in a fixed relationship thereto.

The writing head 20 comprises a generally cylindrical barrel portion 50 having an enlarged flange end 66 adjacent the drum member 12. The writing head is clamped to the translator member 16 by caps 102 which are bolted to the translator member. As disclosed in co-pending, commonly-assigned U.S. patent application Ser. No. 07/670,092, filed Mar. 15, 1991 entitled Writing Beam Focusing Utilizing Light of a Different Wavelength, a printhead assembly is selectively oriented within the barrel portion and comprises a linear array of optical fibers having a writing end facing the drum member 12. The array may be of the type which comprises a plurality of fibers that are mounted on a common substrate and are each connected to a respective, remotely mounted diode laser, not shown. The optical fibers extend from the end of the printhead assembly and out of the writing head barrel through a protective sheath to the diode lasers. The diode lasers can be individually modulated to selectively project light from the writing end of the optical fibers through the lens assembly onto the thermal print medium carried by the drum member 12.

The flange end 66 of the writing head contains the focusing drive described in the above-identified application entitled Writing Beam Focusing Utilizing Light of a Different Wavelength. With an appropriate focus detection system, a moveable lens portion is driven to assure that the output of the fiber optic array is maintained in focus at the appropriate position with respect to the surface of the drum member 12, on or within the writing element mounted thereon. As described in this copending application, the focus detection system comprises a second array of one or more optical fibers mounted on the opposite surface of the substrate with respect to the writing optical fiber array. The focusing fiber is connected at its inlet end to a laser diode which may be mounted in the same region with the writing diodes, but which is selected to produce a second beam of light having a wavelength different from the wavelength of the writing beam. The focusing beam is reflected from the writing element to a photocell, the output of which is fed to a focusing circuit which then generates an appropriate current which is supplied to the focusing drive which moves the movable lens element to focus the writing beam at the appropriate location on or in the writing element.

Figure 2:
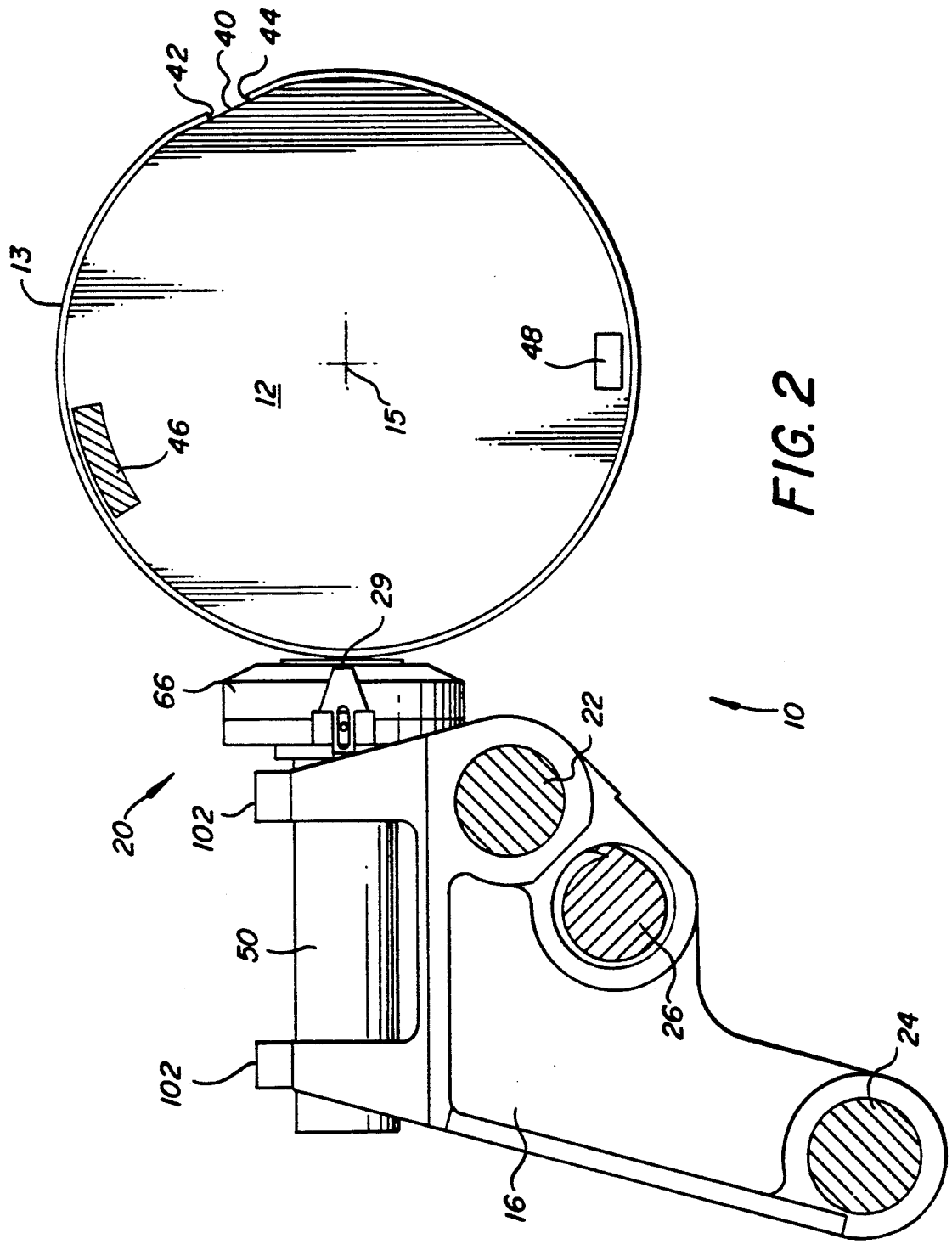
FIG. 2 is an end view of the drum member of the thermal printer taken along line 2—2 in FIG. 1 and illustrating the indicia thereon and the mounting of the indicia reader.

As illustrated in FIG. 2, when the writing element is wrapped around the drum member, it is preferrable that the ends of the writing element do not overlap, for such an overlap would not be securely fastened to the support carriage or drum, and, at the same time, would also create a discontinuity that the auto-focus system could not accommodate. Since it is not practical in a production environment to precisely cut the writing element to provide an abutting fit when it is so wrapped, it will be apparent that a discontinuity will be formed between the leading and trailing ends of the writing element. Such a discontinuity is of such a magnitude, compared to the usual adjustments in the focus normally necessary to focus the writing beam in the writing element, that if uncompensated for, can so adversely affect the focus of the writing beam that the image will be significantly distorted downstream of the discontinuity. This is true because the discontinuity, if focused upon, so changes the focal adjustment of the lens that the auto-focus system cannot immediately refocus at the desired location in or on the writing element after the discontinuity has passed, so that the next portion of the image is out of focus for an indeterminate period of time. Inasmuch as the discontinuity is frequently scanned past the writing beam, the entire portion of the image downstream of the discontinuity will be affected. Accordingly, the present invention provides means for temporarily interrupting the operation of the auto-focus system whenever the discontinuity is within its range to prevent the auto-focus system from attempting to focus on the discontinuity.

In the preferred embodiment the drum member 12 is provided with an optical indicia 46 on the end surface thereof which cooperates with an optical reader 48 which is mounted on the frame member 14 facing the end of the drum bearing the indicia. The location of the reader on the frame member may be selected for space or other considerations, and is only limited by the requirement that the reader be able to "see" the indicia and be located with respect to the drum so that it senses the indicia at the same time that the discontinuity is within the range of the auto-focus system. Thus, the relative location of the indicia, with respect to the discontinuity, is the same as the relative position of the optical reader with respect to location of the auto-focus system.

When the optical reader 48 senses the indicia 14, indicating that the discontinuity is within the range of the auto-focus system, the optical reader generates a signal that is fed to the auto-focus system to block the auto-focus signal from the lens focus drive, effectively locking the lens at that focus so long as the reader senses the indicia and generates a blocking signal. The size or length of the indicia is selected to correspond to the discontinuity so that a blocking signal is generated for a time equal to the time necessary for the discontinuity to pass the auto-focus sensor. When the optical reader no longer senses the indicia, indicating that the discontinuity is no longer within the range of the auto-focus system, it ceases to generate a blocking signal, permitting the auto-focus error signal to again control the lens focus drive. Even if the focal point has changed by the time the blocking signal is removed, the amount of change will be small compared to the change that would be incurred should the auto-focus system attempt to follow the discontinuity. As a result, it will be reasonably quick and easy for the auto-focus system to again bring the writing beam into focus so that the resulting image is not degraded.

ALTERNATIVE EMBODIMENTS

An alternative embodiment is also illustrated in FIG. 2 wherein the drum member 12 is provided with a planar portion, or "flat", 40 that extends axially along the surface of the drum. The flat has a width, transverse the axis of the drum, which cooperates with the circumference of the drum so that the axial edges 42 and 44 of a writing element which has been wrapped around the drum can overlap the flat by approximately 0.47 inch each. For example, with a drum member having a diameter of 6.63 inches and a circumference of 20.83 inches, arranged to carry a writing element having a length of 20.72 inches, the width of the flat is 1.0 inches. At the same time, the width of the flat, when considered with respect to the length of the writing element and the circumference of the drum, should not be so small that the ends of the writing element could overlap when it is wrapped around the drum. In this embodiment, the indicia and the reader are related to the flat on the drum surface, and are arranged to inhibit the auto-focus system when the flat is within the range of the auto-focus detector so that the focusing system does not attempt to focus on the discontinuity caused by the flat on the drum surface.

In yet another embodiment, means are provided in the drum surface to hold the writing element onto the surface in place of a vacuum provided from the interior of the drum. Such holding means often result in a discontinuity in the drum surface which can be accommodated by the present invention.

More particularly, while an optical reader and a visual indicia have been described above, it will be appreciated that other combinations of indicia and sensors may be employed to practice the present invention. For example, magnetic sensors and indicia, as well as other known devices may be used. Still further, the location of the indicia and the sensor is not limited to the end of the drum, as disclosed, but they may be disposed about the periphery of the drum, such as at the end of the writing element.

The invention has been described in detail with particular reference to a presently preferred embodiment, but it will be understood that variations and modifications can be effected within the spirit and scope of the invention.

What is claimed is:

1. In an imaging apparatus utilizing a carriage member arranged to carry a writing element, said carriage member and said writing element each having at least one surface, at least one of said writing element and said carriage member having a discontinuity in the surface thereof, means for generating a light beam movable with respect to said writing element and projectable thereon to generate an image, means for focusing said light beam with respect to said writing element, said focusing means including means for sensing at least one of said surfaces of said writing member and said carriage member to control said focusing means, means for indicating when said discontinuity in said surface is proximate said surface sensing means, and means responsive to said indicating means to inhibit the output of said sensing means when said discontinuity is within its range to prevent said focusing means from focusing on said discontinuity.

2. In an imaging apparatus according to claim 1 wherein said indicating means includes indicia means disposed on a surface of said carriage in a predetermined relationship with said discontinuity.

3. In an imaging apparatus according to claim 2 including means for reading said indicia means and generating a signal when said discontinuity is proximate said focusing means.

4. In an imaging apparatus according to claim 3 wherein said reading means is stationarily mounted adjacent said carriage relative to said indicia means so that said indicia is sensed by said reading means when said discontinuity is proximate said focusing means.

5. In an imaging apparatus utilizing a rotating drum member arranged to carry a writing element, said drum member and said writing element each having at least one surface, said drum member having axially extending means for mounting said writing element on a surface thereof, said mounting means creating a discontinuity in the surface of said drum member, means for generating a light beam movable with respect to said writing element and projectable thereon to generate an image, means for focusing said light beam with respect to said writing element, said focusing means including means for sensing at least one of said surfaces of said writing member and said drum member to control said focusing means, means for indicating when said discontinuity in said drum surface is proximate said surface sensing means, and means responsive to said indicating means to inhibit the output of said sensing means when said discontinuity is within its range to prevent said focusing means from focusing on said discontinuity.

6. In an imaging apparatus according to claim 5 wherein said indicating means includes indicia means disposed on a surface of said drum member in a predetermined relationship with said discontinuity.

7. In an imaging apparatus according to claim 6 including means for reading said indicia means and generating a signal when said discontinuity is proximate said focusing means.

8. In an imaging apparatus according to claim 7 wherein said reading means is stationarily mounted adjacent said drum member relative to said indicia means so that said indicia is sensed by said reading means when said discontinuity is proximate said focusing means.

9. In an imaging apparatus according to claim 6 wherein said indicia is disposed on the end face of said drum member.

10. In an imaging apparatus according to claim 6 wherein said indicia is disposed on the periphery of said drum member at an end thereof.

11. In an imaging apparatus utilizing a receiver element upon which an image is written from a donor element by a light source, means for mounting said donor and receiver elements in intimate superposed relationship on a rotatable drum member, each of said receiver and donor elements and said drum member having at least one surface, at least one of said elements and said drum member having a discontinuity in the surface thereof, said light source being movable with respect to said drum member and arranged to direct a beam of light to said donor element where it is at least partially absorbed to transfer an image to said receiver element, means for focusing said light source with respect to said donor element, said focusing means including means for sensing at least one of said surfaces of said receiver and donor elements and said drum member to control said focusing means, the improvement comprising:

means for indicating when said discontinuity in said surface is proximate said surface sensing means including indicia means disposed on the end face of said drum member in a predetermined relationship with said discontinuity, and means for reading said indicia means, said reading means being stationarily mounted adjacent said drum member relative to said indicia means so that said indicia is sensed by said reading means to generate a signal when said discontinuity is proximate said focusing means, means responsive to said signal generated by said reading means to inhibit the output of said sensing means when said discontinuity is within its range to prevent said focusing means from focusing on said discontinuity.

12. In an imaging apparatus utilizing a carriage member arranged to carry a writing element, said carriage member and said writing element each having at least one surface, at least one of said writing element and said carriage member having a discontinuity in the surface thereof, means for generating a light beam movable with respect to said writing element and projectable thereon to generate an image, means for focusing said light beam with respect to said writing element, the method of focusing said light beam including the steps of sensing at least one of said surfaces of said writing member and said carriage member and controlling said focusing means, sensing when said discontinuity in said surface is proximate said surface sensing means, and inhibiting the output of said sensing means when said discontinuity is within its range to prevent said focusing means from focusing on said discontinuity.

13. In an imaging apparatus utilizing a receiver element upon which an image is written from a donor element by a light source, means for mounting said donor and receiver elements in intimate superposed relationship on a rotatable drum member, each of said receiver and donor elements and said drum member having at least one surface, at least one of said surfaces having a discontinuity therein, said light source being movable with respect to said drum member and arranged to direct a beam of light to said donor element where it is at least partially absorbed transfer an image to said receiver element, means for focusing said light source with respect to said donor element, said focusing means including means for sensing at least one of said surfaces of said receiver and donor elements and said drum member to control said focusing means, the method of focusing comprising the steps of:

sensing at least one of said surfaces to control said focusing means, indicating when said discontinuity is proximate said surface sensing means by reading an indicia means disposed on the end face of said drum member in a predetermined relationship with said discontinuity, generating a signal in response to the reading of said indicia means, and inhibiting the output of said sensing means when said discontinuity is within its range to prevent said focusing means from focusing on said discontinuity.

* * * * *